United States Patent [19]

Nakamura

[11] Patent Number: 4,553,690
[45] Date of Patent: Nov. 19, 1985

[54] CLUTCH ROTOR FOR AN ELECTROMAGNETIC CLUTCH AND METHOD OF MAKING THE ROTOR

[75] Inventor: Yasuo Nakamura, Gunma, Japan

[73] Assignee: Sanden Corporation, Gunma, Japan

[21] Appl. No.: 511,961

[22] Filed: Jul. 8, 1983

[30] Foreign Application Priority Data

Jul. 9, 1982 [JP] Japan .................. 57-119290

[51] Int. Cl.[4] .................. F16H 7/02; B21D 53/26
[52] U.S. Cl. .................. 29/159 R; 29/159.3; 228/112
[58] Field of Search .................. 29/159 R, 159.3; 228/173 C, 112, 113, 114

[56] References Cited

U.S. PATENT DOCUMENTS

| | | | |
|---|---|---|---|
| 2,685,856 | 8/1954 | Wickwire et al. | 113/52 |
| 2,929,345 | 3/1960 | Zatyko | 113/51 |
| 3,044,594 | 7/1962 | Bernard | 192/84 |
| 3,082,933 | 3/1963 | Bernard | 230/15 |
| 3,624,881 | 12/1971 | Brown | 228/113 |
| 3,654,790 | 4/1972 | Zatko | 72/82 |
| 3,777,360 | 12/1973 | Welch | 228/112 |
| 3,977,264 | 8/1976 | Sproul | 74/230 |
| 4,090,284 | 5/1978 | Kraft | 29/159.3 |

FOREIGN PATENT DOCUMENTS

| | | | |
|---|---|---|---|
| 2314838 | 6/1975 | France | 228/112 |
| 2384564 | 11/1978 | France | 29/159.3 |
| 56-148106 | 6/1981 | Japan | 29/159 R |

Primary Examiner—Kenneth J. Ramsey
Attorney, Agent, or Firm—Banner, Birch, McKie & Beckett

[57] ABSTRACT

An electromagnetic clutch with an improved rotor, and a method of manufacturing the rotor includes the steps of: (a) forming a cup-shaped blank with a generally cylindrical flange wall and a bottom plate by bending a piece of sheet metal; (b) forming at least one approximately V-shaped groove in the blank flange wall by a pressing operation; (c) forming a final V-shaped groove by applying a roller working operation to the approximately V-shaped groove; and (d) welding an inner cylindrical member to a radial inner surface of the bottom plate of the cup-shaped blank.

3 Claims, 14 Drawing Figures

CLUTCH ROTOR FOR AN ELECTROMAGNETIC CLUTCH AND METHOD OF MAKING THE ROTOR

TECHNICAL FIELD

This invention relates to electromagnetic clutches and, more particularly, to a clutch rotor and a method of making the clutch rotor. Electromagnetic clutches of this type are adaptable for use in controlling the transmission of an automobile engine output to a refrigerant compressor of an automobile air conditioning apparatus.

BACKGROUND OF THE INVENTION

The basic construction and operation of the electromagnetic clutches which are usable for controlling the power transmission between the automobile engine and the refrigerant compressor to selectively drive the compressor are well known. Examples of such basic construction and operation are found in prior patents, such as U.S. Pat. Nos. 3,044,594 and 3,082,933.

Figure 1:
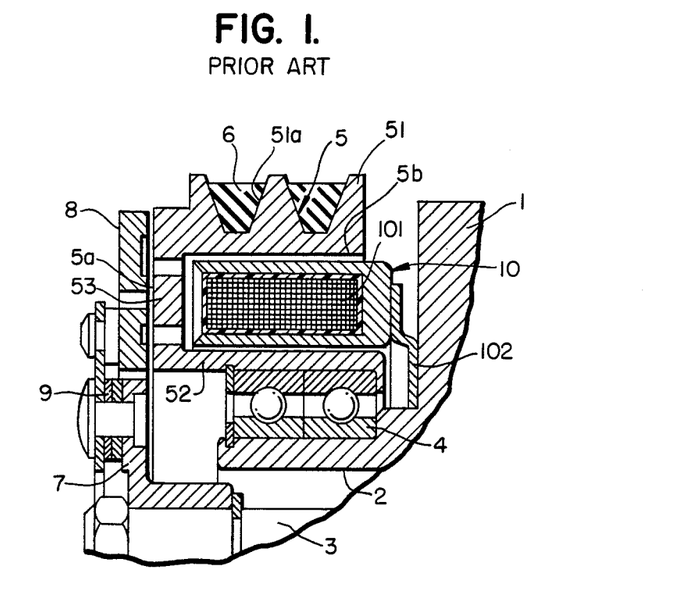
FIG. 1 is a cross-sectional view of a prior art electromagnetic clutch.

Referring to FIG. 1 herein, a prior art electromagnetic clutch will be described. FIG. 1 is a cross-sectional view of a known electromagnetic clutch which is mounted on a refrigerant compressor. The electromagnetic clutch is disposed on the outer peripheral portion of a tubular extension 2 projecting from an end surface of a compressor housing 1. Tubular extension 2 surrounds a drive shaft 3 of the compressor. Drive shaft 3 is rotatably supported in compressor housing 1 through bearings (not shown). The electromagnetic clutch includes a clutch rotor which is rotatably mounted on tubular extension 2 through a bearing 4, and is connected to an automobile engine (not shown) through a belt 6. Rotor 5 is thus subjected to strong tension forces. Rotor 5 is provided with a plurality of concentric arcuate magnetic pole faces 5a at its axial end. Outer terminal end of drive shaft 3 extends from tubular extension 2, and a hub 7 is fixed on the extending terminal end of drive shaft 3. An annular armature plate 8 is flexibly joined by a plurality of leaf springs 9 to hub 7 in such a fashion that armature plate 8 faces pole faces 5a of rotor 5 with a predetermined axial air gap between plate 8 and pole faces 5a. An electromagnet 10 is mounted on compressor housing 1 and is concentric with drive shaft 3. Electromagnet 10 is fixed within an annular hollow portion 5b formed in rotor 5 with a surrounding air gap to supply the magnetic flux for attracting armature plate 8 to the pole faces 5a of rotor 5.

Thus, when an electromagnetic coil 101 of electromagnet 10 is energized, armature plate 8 is attracted to concentric pole faces 5a of rotor 5. Drive shaft 3 is then rotated together with rotor 5 by the engine output through leaf springs 9 and hub 7. When electromagnetic coil 101 of electromagnet 10 is not energized, armature plate 8 is separated from pole faces 5a of rotor 5 due to elasticity of leaf springs 9. Rotor 5 is thus rotated by the engine output, but the compressor is not driven.

In these prior electromagnetic clutches, rotor 5 consists of an outer cylindrical portion 51 formed with at least one V-shaped groove 51a for receiving belt 6, an inner cylindrical portion 52, and an axial end annular plate portion 53 which connects outer and inner cylindrical portions 51. The concentric pole face 5a are formed in the axial end surface of annular plate portion 53. This rotor 5, as shown in FIG. 1, has been formed as an integral body of magnetic material by forging followed by machining. But the resultant rotor 5 is heavy, so that the total weight of the compressor having the electromagnetic clutch is relatively large. This means that the load on the drive source, such as the automobile engine, is increased. Furthermore, since the forging process only forms a preformed or rough rotor, an amount of rotor material must be machined to form the final, accurately dimensioned rotor, with the result that relatively large quantities of waste metal are produced. Such forging and machining of the rotor also consumes a great deal of time.

Figure 2:
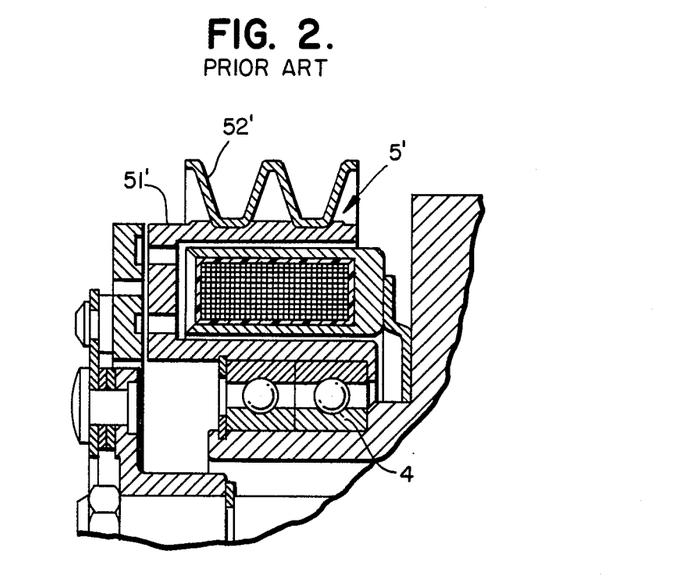
FIG. 2 is a cross-sectional view of another prior art electromagentic clutch.

In order to avoid these disadvantages and to obtain the light weight clutch rotor, another prior art rotor, rotor 5, shown in FIG. 2, has been made. In rotor 5' an annular magnetic body 51' and a annular V-shaped groove member 52' are separately produced by a press forming method. In this construction, main annular body 51' and V-shaped groove member 52' are brazed to one another after main annular body 51' is fitted into V-shaped groove member 52'. In this method, welding material is unequally deposited between main annular body 51' and groove member 52', resulting in an unbalance of rotor 5'. Furthermore, main annular body 51' of rotor 5' is formed by cold forging, which requires the use of a large press machine. In this method, the main annular body 51' must be passed through a plurality of working processes, which include an annealing process to remove the strain on the main annular body 51' caused by such cold forging to form the final, accurately dimensioned rotor 5'. The forming process of the rotor is thus complicated.

Figure 3:
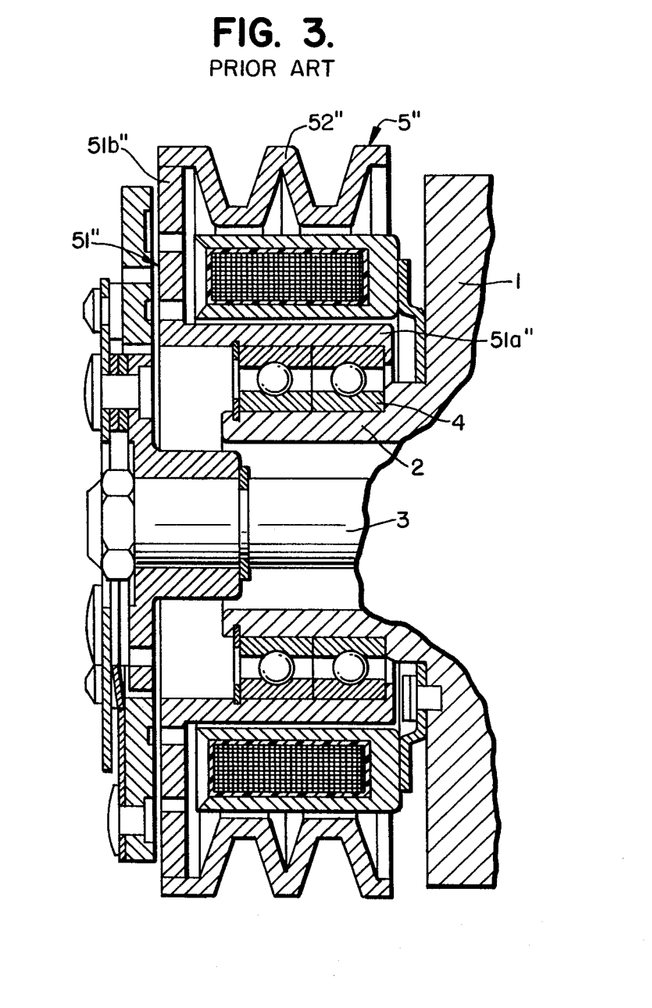
FIG. 3 is a cross-sectional view of still another prior art electromagnetic clutch.

In order to avoid the above disadvantages, another prior art rotor, rotor 5" shown in FIG. 3, has been made. In rotor 5" an L-shaped magnetic body 51" and an annular V-shaped groove member 52" are separately formed by a press forming method. In this construction, L-shaped magnetic body 51" consists of inner cylindrical member 51a" and an axial end annular plate portion 51b" and both member 51b" and 52" are brazed to one another. Since the mating surfaces between magnetic body 51" and V-shaped groove member 52" are brazed, the strength of the rotor at the mating surfaces is unstable. Rotor 5" is also unbalanced because of the difficulty in obtaining a uniform brazed connection between the mating surfaces.

SUMMARY OF THE INVENTION

It is the primary object of this invention to provide an electromagnetic clutch of reduced weight and at low cost without harm to the magnetic property of the clutch.

It is another object of this invention to provide a light weight rotor of an electromagnetic clutch which is simple in construction and simply produced with less wasted material and time.

It is still another object of this invention to provide an electromagnetic clutch which is simple to assemble.

According to this invention, an electromagnetic clutch comprises a first magnetic rotatable member rotatably supported on a first bearing, the first rotatable member being provided with at least one annular groove in the outer portion thereof for receiving a belt operatively connecting it with an external driving power source to be rotated by the external driving power source and having axial end magnetic friction surfaces, a second rotatable member rotatably supported on a second bearing, an annular magnetic member being supported on the second rotatable member so as to be capable of limited axial movement and having an axial end surface which faces the magnetic friction surfaces of the first rotatable member with an axial gap therebetween, and electromagnetic means associated with one of the first rotatable member and the annular magnetic member for attracting the other member, wherein the first rotatable member comprises an outer cylindrical member and axial end plate member which are formed integrally with one another with the annular groove formed on the outer cylindrical member by pressing and rolling operations, and an inner cylindrical member which is welded at the radial inner end surface of the axial end plate member.

A method of making a clutch rotor for use in an electromagnetic clutch according to this invention includes the steps of forming a cup-shaped blank with a generally cylindrical annular flange wall and a round depression at outer peripheral portion of inner surface of a bottom plate; then forming at least one approximately V-shaped groove in the blank flange wall by a pressing operation; then applying a roller working operation to the approximately V-shaped groove to form the final V-shaped groove; and then welding an inner cylindrical member to the bottom plate at its radial inner end surface.

Further objects, features and other aspects of this invention will be understood from the following detailed description of a preferred embodiment of this invention referring to be annexed drawings.

DETAILED DESCRIPTION OF A PREFERRED EMBODIMENT

Figure 4:
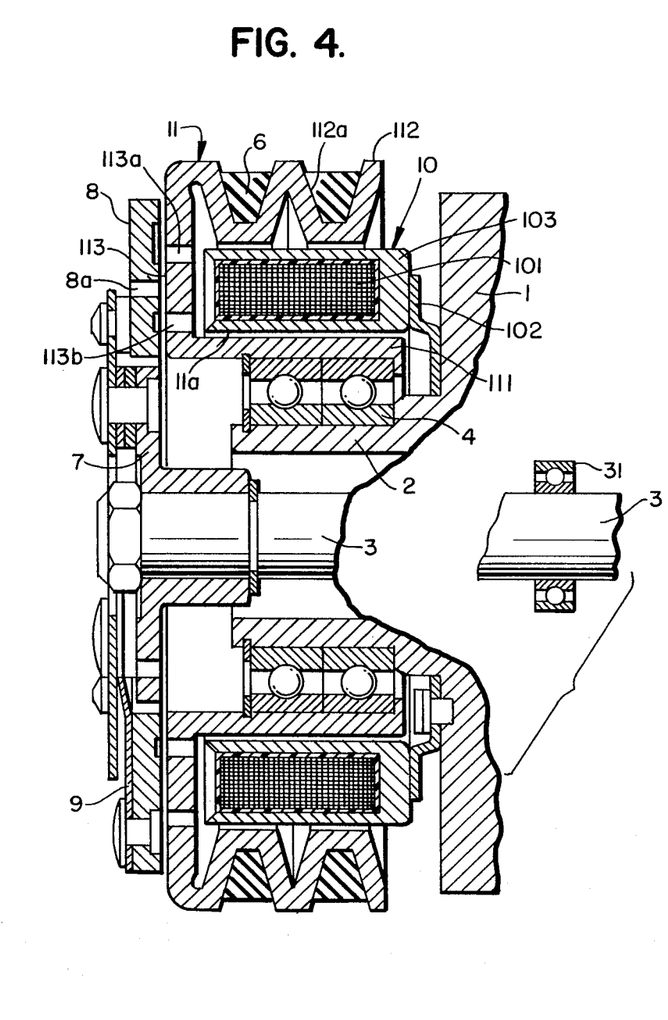
FIG. 4 is a cross-sectional view of an electromagnetic clutch in accordance with the present invention.

Referring to FIG. 4, the shown embodiment is similar to the prior art electromagnetic clutches shown in FIGS. 1, 2 and 3, except for the construction of the clutch rotor. Therefore, the similar parts are represented by the same reference characters as in FIG. 1 and a detailed description of the similar parts will be omitted for the purpose of simplifying the following description.

In the embodiment shown in FIG. 4, clutch rotor 11, which is formed of magnetic material, such as steel, comprises an inner cylindrical portion 111, the inner wall surface of which is fitted on the outer peripheral surface of ball bearing 4, an outer annular portion 112 formed with at least one belt receiving groove 112a, and an axial end annular plate portion 113 connecting the outer and inner portions 111,112. In this embodiment, outer annular portion 112 and axial end plate portion 113 are formed integral with one another and inner cylindrical portion 111 in welded to axial end plate portion 113. An annular hollow portion 11a is thus defined by these three portions 111–113 to contain the electromagnet 10 in a stationary position. Electromagnet 10 is fixed on compressor housing 1 by a support plate 102. The axial end of annular plate portion 113 has concentric arcuate slots as shown by 113a, 113b to form concentric magnetic pole faces at its axial end. Armature plate 8 also has arcuate slots as shown by 8a.

Belt 6, which is operatively connected to an automobile engine, is received in groove 112a of rotor 11, so that rotor 11 is usually rotated by the engine output through belt 6.

In this arrangement, when electromagnet coil 101 is energized, magnetic flux flows through a closed loop comprising a magnetic housing 103 of electromagnet 10, outer annular portion 112 of rotor 11, armature plate 8, axial end plate portion 113 of rotor 11, and inner cylindrical portion 111 of rotor 11. Therefore, armature plate 8 is attracted to axial end plate portion 113, so that drive shaft 3 is rotated together with rotor 11 through hub 7. Drive shaft 3 is connected to an automotive air conditioning compressor (not shown), and is rotatably supported by a bearing, shown schematically as 31.

Referring to FIGS. 5a–5f, the procedure for making a clutch rotor for an electromagnetic clutch according to this invention will be described.

Figure 5A:
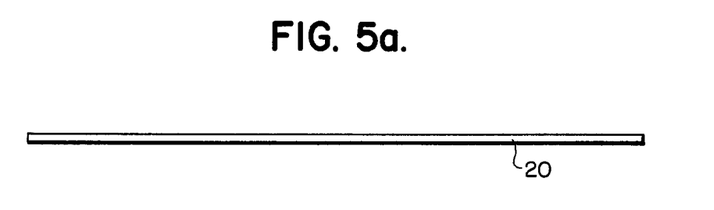
FIGS. 5a–5f are diagrammatic sectional views illustrating the method of making a clutch rotor according to the present invention.
Figure 5B:
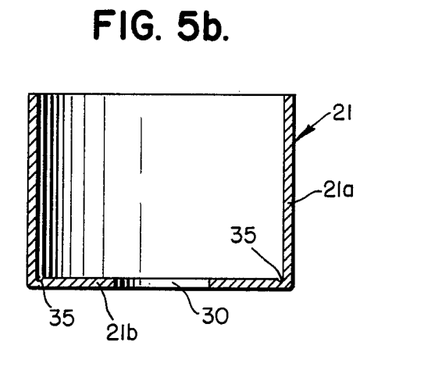

As a first step for making the clutch rotor, a circular or annular sheet metal blank 20 (FIG. 5a) of proper size is bent by usual pressing operations in a series of cup dies to form cup-shaped blank 21 (FIG. 5b). Cup-shaped blank 21 consists of a cylindrical wall portion 21a projecting from the outer peripheral surface of bottom end plate portion 21b. A circular hole 30 located at the center portion of bottom end plate portion 21b and a round depression 35 disposed on the inner side of cup-shaped blank 21 at the junction of cylindrical wall portion 21a and bottom end plate portion 21b are formed by punching during the pressing operation. Bottom end plate portion 21b is thus formed as the axial end plate portion of the rotor.

Figure 5C:
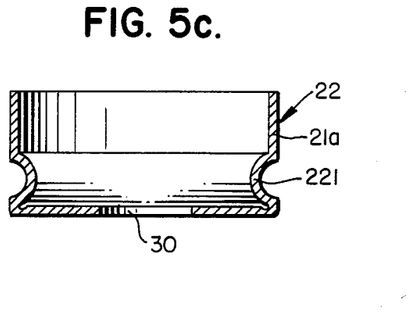

The cup-shaped blank 21 of FIG. 5b, in the next step of making clutch rotor 10, is bent along the cylindrical wall portion 21a by a pressing operation to form a first rounded groove stage blank 22 of FIG. 5c. The first rounded groove stage blank 22 has a first rough (approximately V-shaped) groove 221 formed at the axial inner end portion of cylindrical wall portion 21a of cup-shaped blank 21.

Figure 5D:
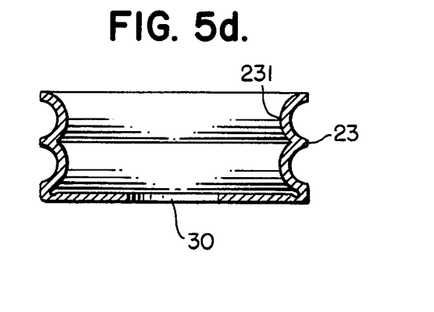

The remaining straight section of cylindrical wall portion 21a of first rounded groove stage blank 22 is bent by a further pressing operation to form a second rounded groove stage blank 23 of FIG. 5d. The outer axial end portion of cylindrical wall portion 21a is thus bent to form a second rough (approximately V-shaped) groove 231. The devices used in the pressing operations of these two stages will be more fully described hereinafter.

Figure 5E:
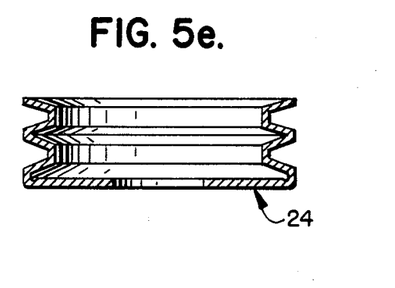

The next step in making the clutch rotor is illustrated in FIG. 5e. The rounded groove stage blank 23 with first and second rough grooves 221 and 231 are roller worked to form the pre-final rotor 24 with final V-shaped grooves in which a belt can be received. This roller cold working operation for forming V-shaped grooves may be carried out in the roller spinning dies generally indicated at 60 in FIG. 8, described below.

Figure 5F:
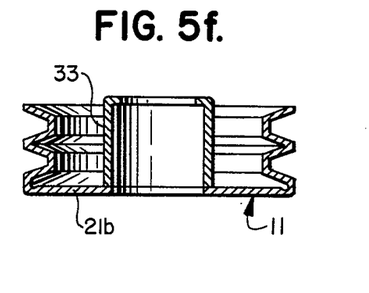

The final operation to make clutch rotor 11 is illustrated in FIG. 5f. In this step an inner cylindrical portion 111 of rotor 11, such as pipe member 33, is welded to the inner end surface of bottom end plate 21b of cup-shaped stage blank 21, i.e., to axial end plate portion 113 of rotor 11, by friction welding. By completing the above operations or steps, rotor 11 in its final accurate dimensions, is easily obtained.

Figure 6:
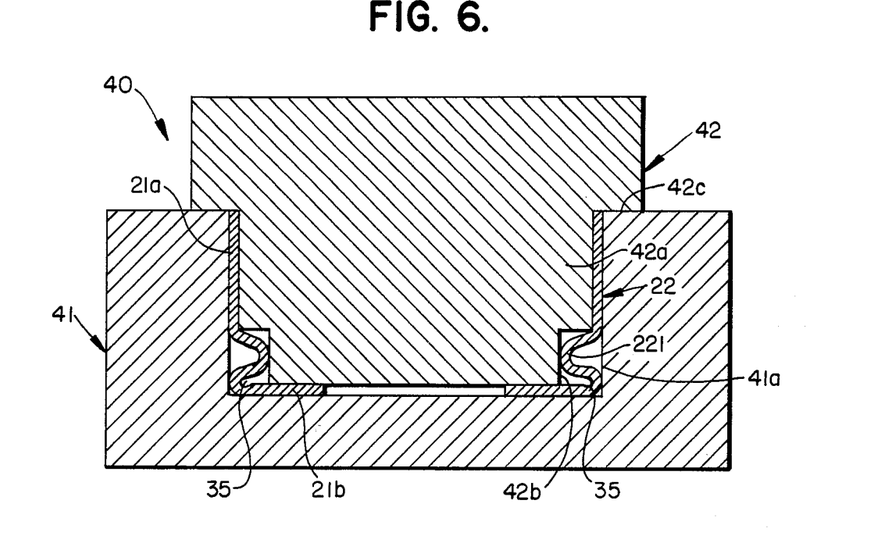
FIG. 6 is a diagrammatic sectional view through a press dies used to form the pressed blank of FIG. 5c.
Figure 7:
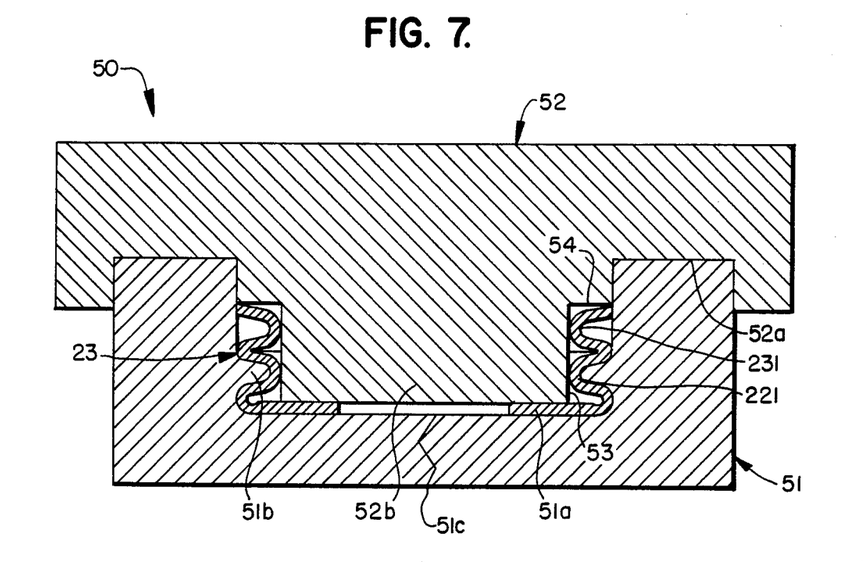
FIG. 7 is a diagrammatic sectional view through a press dies used to press the stage blank of FIG. 5c to form the press blank of FIG. 5d.

FIGS. 6 and 7 illustrate typical press equipment which may be used to form the first and second rounded groove stage blanks 22 and 23 of FIGS. 5c and 5d from cup-shaped stage blank 21 of FIG. 5b. Referring to FIG. 6, first step press equipment 40 to form the first rounded groove stage blank 22 includes a bottom die 41 formed with a cylindrical depression 41a for receiving the cup-shaped stage blank 21 and an upper die 42. Upper die 42 has a projecting portion 42a, with a configuration that corresponds approximately to the configuration of cylindrical depression 41a, extending from one end surface thereof, and an annular hollow portion 42b that is formed on the extending outer peripheral portion of projecting portion 42a. Hollow portion 42b receives first rough groove 221 as it is formed during the pressing operation. The depth of cylindrical depression 41a is shallower than the axial length of cylindrical wall portion 21a of cup-shaped blank 21. Upper die 42 has a shoulder portion 42c which is connected between projecting portion 42a and the main body of upper die 42, and functions as the press portion of this equipment, i.e., the portion which contacts and presses down on wall portion 21a.

In this arrangement, if cup-shaped stage blank 21 is disposed within cylindrical depression 41a of bottom die 41, the cylindrical wall portion 21a of cup-shaped stage blank 21 extends from bottom die 41. In this condition, upper die 42 is moved downwardly in such a fashion that the projecting portion 42a is inserted within the cylindrical depression 41a. During movement of upper die 42, shoulder portion 42c contacts the axial end surface of cylindrical wall portion 21a and compress it until the shoulder portion contacts the upper end surface of bottom die 41. The inner end portion of cylindrical wall portion 21a is thus bent by compression due to movement of upper die 42, and a part of wall portion 21a extends or bends into hollow portion 42b to form first rough groove 221. Since round depression 35 is formed at the connection between cylindrical wall portion 21a and bottom end plate portion 21b, this bending operation of cylindrical wall portion 21a is easily done.

A further pressing operation is applied to the first rounded groove blank 22 by second step press equipment 50 of FIG. 7 to form second rounded groove blank 23 of FIG. 5e. Second step press equipment 50 comprises a bottom die 51 and an upper die 52. Bottom die 51 has a cylindrical depression 51a for receiving first rounded groove blank 22 and an approximate V- or U-shaped projection 51b extending from the inner wall surface of cylindrical depression 51a for insertion into the first rough groove 221. Upper die 52 has a contact portion 52a to securely contact the upper end portion of bottom die 51, and a projecting portion 52b extending from one end surface of upper die 52 for passage into cylindrical depression 51a. Projecting portion 52b has an outer peripheral wall at its upper end which approximately mates with the inner peripheral wall of cylindrical depression 51a at its upper end. Projecting portion 52b is provided with an annular hollow space 53 at its end portion to contain first rough groove 221 and to receive second rough groove 231 as it is formed during the pressing operation of press 50. A shoulder portion 54, which functions as the press portion of die 50 to press down on wall portion 21a and form the second rough rounded groove, is formed on projecting portion 52b to connect hollow space 53 with projecting portion 52b. Further, bottom die 51 is split along line 51c so that bottom die 51 is easily assembled around first rounded groove blank 22.

In this arrangement, first rounded groove stage blank 22 is disposed within cylindrical depression 51a of bottom die 51, and upper die 52 is moved downwardly to insert projecting portion 52b into cylindrical depression 51b. This movement of upper die 52 is continued until the top surface of projecting portion 52b touches against bottom end plate portion 21b of blank 23. During movement of upper die 52, shoulder portion 54 touches the axial end surface of wall portion 21a of blank 22 and compresses it. Wall portion 21a of blank 22 is thus bent by this compression operation of shoulder portion 54 and a part of the wall portion extends or bends into hollow portion 53 to form second rough groove 231.

Figure 8:
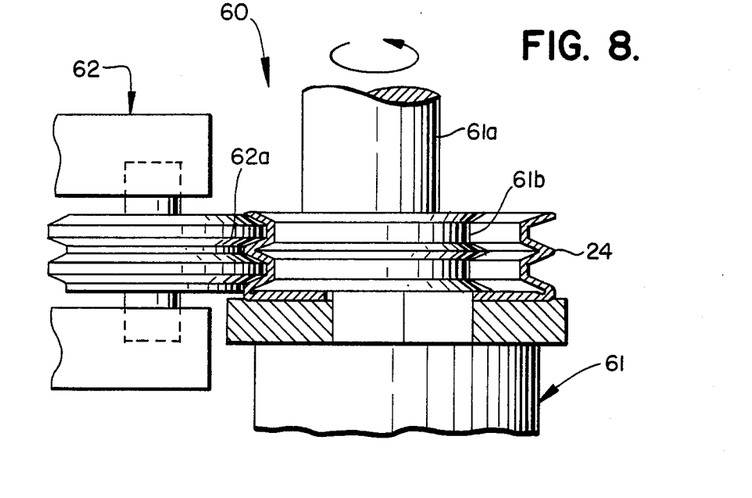
FIG. 8 is a diagrammatic view illustrating spin die forms used to complete spinning and cold working of the press blank of FIG. 5d to produce the rotor of FIG. 5e.

After forming second rounded groove blank 23, a roller working operation is applied to blank 23 by roller spinning equipment 60 of FIG. 8 to form preformed rotor 24 with the final configuration of the V-shaped groove. Roller spinning equipment 60 comprises moving die 61 and pressing die 62. Moving die 61 includes a crank shaft 61a rotatably supported on a base of die 61 and a first roller member 61b which is fitted on crank shaft 61a to rotate with it. An outer surface of roller member 61b corresponds with the inner surface of the final configuration of the V-shaped groove. Pressing die 62 includes a second roller member 62a rotatably supported on the base of die 62. The outer surface of second roller member 62a corresponds with the outer surface of the final configuration of the V-shaped groove. Therefore, the gap between first and second roller members 61b and 62a defines the final shape of the V-shaped groove.

In this arrangement, second rounded groove blank 23 is attached on moving die 61 and is rotated by crank shaft 61a. Then, pressing die 62 is radially moved toward first roller member 61b to contact and press against the exterior surface of blank 23. Second roller member 62a is rotated together with first roller member 61b to form the V-shaped groove by cold forging.

Figure 9:
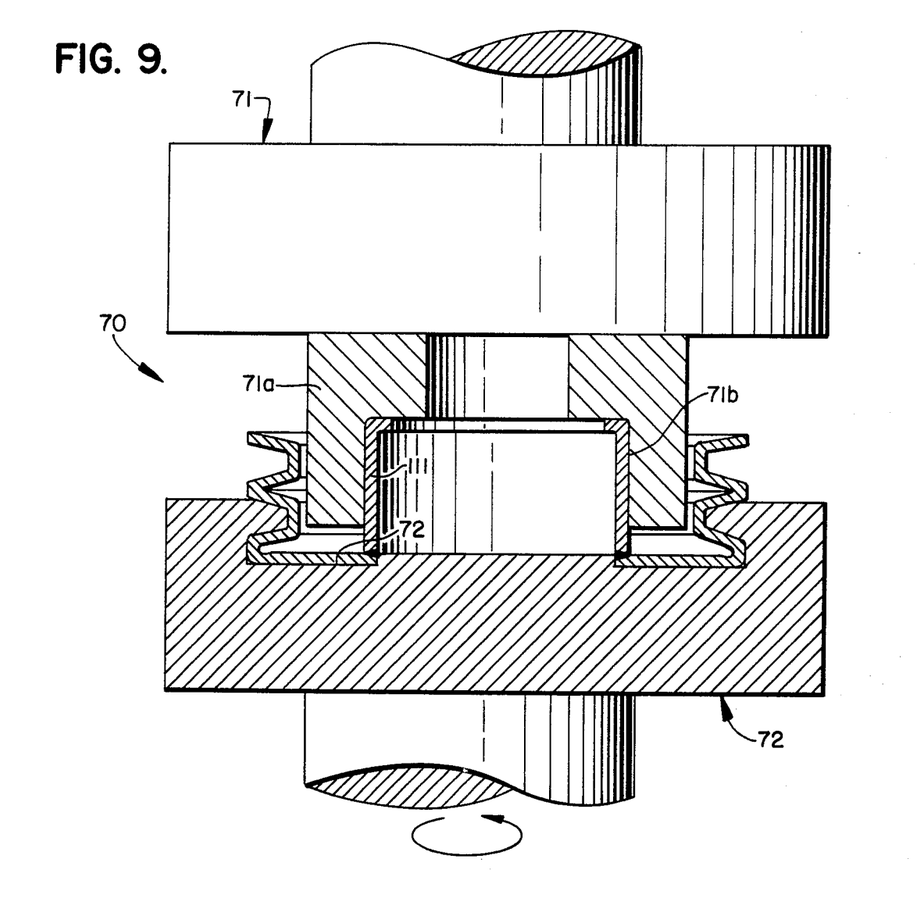
FIG. 9 is a diagrammatic sectional view illustrating friction welding apparatus to produce the rotor of FIG. 5f in its final accurate dimensions.

In the final step or operation of this method, an inner cylindrical member is welded to the bottom end plate of the blank by friction welding equipment 70 of FIG. 9. Equipment 70 comprises upper holder die 71 and bottom holder die 72. Upper holder die 71 has a projection 71a in which a cylindrical depression 71b is formed for receiving inner cylindrical member 111. Bottom holder die 72 have a receiving depression 72 in which bottom end plate portion 21b of the blank is disposed.

In this arrangement, the blank with the final V-shaped groove is disposed in bottom die 72 and cylindrical member 111 is disposed in cylindrical depression 71b of upper die 71. Then, cylindrical member 111 is placed in contact with, and pressed against, the bottom end plate portion along in inner radial area; and bottom die 72 is rotated. During the rotation of bottom die 72, end surface of cylindrical member 111 and bottom end plate portion are in contact, which causes frictional heating and the formation of a friction welded bond between the cylindrical member and the bottom end plate.

As mentioned above, the clutch rotor is comprised of an outer cylindrical portion and an axial end plate portion formed integrally with one another, and an inner cylindrical portion welded on the end plate portion, whereby reliability of dimensional accuracy and strength of the clutch rotor is improved, and balance of the clutch rotor is easily attained. Furthermore, a simple pipe member can be used as the inner cylindrical member of clutch rotor, whereby the cost of the rotor can be reduced, and the rotor easily manufactured.

This invention has been described in detail in connection with the preferred embodiment, but this is an example only and the invention is not restricted thereto. It will be easily understood by those skilled in the art that other variations and modifications can be easily made within the scope of this invention.

I claim:

1. A method of making a clutch rotor for use in an electromagnetic clutch comprising the steps of:

(a) forming a cup-shaped blank with a generally cylindrical flange wall and bottom plate by bending a piece of sheet metal;
   (b) forming at least one approximately V-shaped groove in said blank flange wall by holding the cup-shaped blank in a first die, pressing on the outer edge of the blank flange wall with a second die to form the approximately V-shaped groove within a confined space between a projection of the second die and a cup receiving depression of the first die;
   (c) forming a final V-shaped groove by applying a roller working operation to said approximately V-shaped groove; and
   (d) welding an inner cylindrical member to a radial inner surface of said bottom plate of said cup-shaped blank.

2. The method of claim 1 wherein step (a) includes forming a depression at said outer peripheral portion of said bottom plate along the juncture between the flange wall and the bottom plate.

3. The method of claim 1 wherein step (d) includes friction welding the inner cylindrical member to the bottom plate by holding the cup-shaped blank in a first die, holding the inner cylindrical member in a second die, placing the inner cylindrical member in contact with the bottom plate and rotating one of the first and second dies with respect to the other.

* * * * *

UNITED STATES PATENT AND TRADEMARK OFFICE
CERTIFICATE OF CORRECTION

PATENT NO. : 4,553,690

DATED : November 19, 1985

INVENTOR(S) : Yasuo Nakamura

It is certified that error appears in the above-identified patent and that said Letters Patent is hereby corrected as shown below:

In the Abstract, line 2, after "rotor" insert —are disclosed. The method—.

Signed and Sealed this

Eighteenth Day of February 1986

[SEAL]

Attest:

DONALD J. QUIGG

Attesting Officer

Commissioner of Patents and Trademarks